J. S. & T. B. ATTERBURY.
MANUFACTURE OF DRINKING GLASSES.
No. 50,437. Patented Oct. 17, 1865.
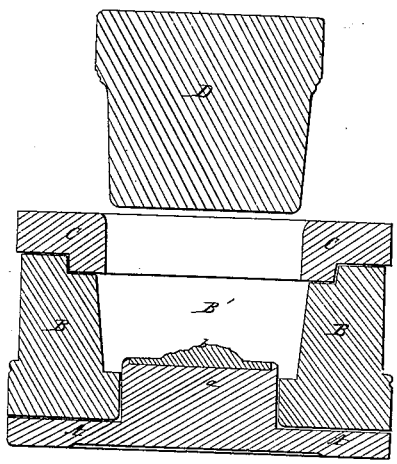

UNITED STATES PATENT OFFICE.

J. S. ATTERBURY AND T. B. ATTERBURY, OF PITTSBURG, PA.

IMPROVED MANUFACTURE OF DRINKING-GLASSES.

Specification forming part of Letters Patent No. 50,437, dated October 17, 1865.

*To all whom it may concern:*

Be it known that we, JAMES S. ATTERBURY and THOMAS B. ATTERBURY, of Pittsburg, Allegheny county, and State of Pennsylvania, have invented a new and useful Improvement in the Manufacture of Pressed Glass Vessels; and we do hereby declare that the following is a full, clear, and exact description thereof, reference being had to the accompanying drawings, making a part of this specification, in which—

Figure 1 is a diametrical section through one form of mold for producing busts or medallions in their bottoms. Fig. 2 is a top view of the bottom or punty plate of the glass-mold. Figs. 3 and 4 show a drinking-vessel with a figure impressed upon its bottom.

Similar letters of reference indicate corresponding parts in the several figures.

The object of our invention is to produce pressed glass vessels having busts or figures of any desired kind impressed permanently in their bottoms in such manner that these figures will present a very clear and brilliant appearance aided by the thickness of glass and the refraction thereof.

To enable others skilled in the art to understand our invention, we will describe its construction and operation.

The molds in which the vessels are formed will be varied in their construction and shape, according to the configuration of the vessels which it is desired to produce. We have represented one form of mold-box in the accompanying drawings for producing pressed glassware, which will give a correct understanding of the manner of carrying out our invention generally for all kinds of vessels. This mold consists of three sections—viz., the punty or base plate A, which has a central prominence, $a$, with a recess formed in its upper end to receive a metal or cast, $b$, in alto-rilievo, of the figure which it is desired to print or impress upon the bottoms of the vessels which are formed in the mold. B is the body of the mold, having a circular chamber, B'. C is the ring-plate, which fits on the top of the portion B and completes the mold-box.

The plunger D, which is employed in the usual manner of making pressed molds, is constructed to fit within the chamber of the mold-box, and to press the glass into the proper shape therein.

The medallion $b$ may be applied either to the bottom plate, A $a$, or to the plunger D. We prefer to have the impression made on the outside surfaces of the bottoms of the vessels, so that there will be a thickness of glass intervening for the purpose of increasing the beauty, distinctness, and brilliancy of the figures by the reflection or refraction of the glass. After the vessels are thus produced the figures can be painted any desired color to suit the fancy. If white paint be used the figures will have the appearance of plaster casts set into the glass.

Having thus described our invention, what we claim as new, and desire to secure by Letters Patent, is—

As a new article of manufacture, a glass vessel having a colored depression in its base in the likeness of a human face or other figure, produced therein by the means substantially as described.

J. S. ATTERBURY.
T. B. ATTERBURY.

Witnesses:
A. B. STEVENSON,
J. SISKMAN.